(12) United States Patent
Billarant et al.

(10) Patent No.: US 6,596,371 B1
(45) Date of Patent: Jul. 22, 2003

(54) COMPONENT FOR OVERCASTING FOR A MOULDED OBJECT

(75) Inventors: Patrick Billarant, Charlotte, NC (US); Marc Woodling, Charlotte, NC (US)

(73) Assignee: Aplix, Inc., Charlotte, NC (US)

( * ) Notice: Subject to any disclaimer, the term of this patent is extended or adjusted under 35 U.S.C. 154(b) by 0 days.

(21) Appl. No.: 09/487,938

(22) Filed: Jan. 19, 2000

(51) Int. Cl.$^7$ .......................... B32B 3/06; A44B 21/00; A44B 18/00
(52) U.S. Cl. .................. 428/99; 428/100; 428/119; 428/900; 24/442
(58) Field of Search ................ 428/99, 100, 900, 428/119; 24/442

(56) References Cited

U.S. PATENT DOCUMENTS 5,061,540 A * 10/1991 Cripps et al. ................ 428/100
5,688,576 A * 11/1997 Ohno et al. .................. 428/100

FOREIGN PATENT DOCUMENTS

EP 0 657 118 A1 6/1995

* cited by examiner

Primary Examiner—Alexander S. Thomas
(74) Attorney, Agent, or Firm—Adams Evans P.A.

(57) ABSTRACT

A fastener member for being secured to the surface of a foam body during a molding process in a mold form. The fastener member includes an elongate base having upper and lower opposed faces with fixating elements positioned on the lower face of the base for being positioned within and protected by a mold cavity in a wall of the mold form against foam contamination during the molding process. First and second opposed, elongate sealing ramps positioned on the upper face of the base by respective proximal ends and diverge outwardly and upwardly at an angle oblique to the base and define respective outwardly-extending distal ends. The base is sized to fit within the mold cavity with outer surfaces of the respective first and second ramps engaging and sealingly contacting respective upper wall corners of the mold at points of contact intermediate the proximal and distal ends. A magnetically-attractable material is fixed to the base for being magnetically attracted to a magnet positioned in the mold cavity to thereby seal the cavity against the sealing ramps to prevent foam from entering the mold cavity and contaminating the fixating elements.

8 Claims, 1 Drawing Sheet

COMPONENT FOR OVERCASTING FOR A MOULDED OBJECT

Figure 1:
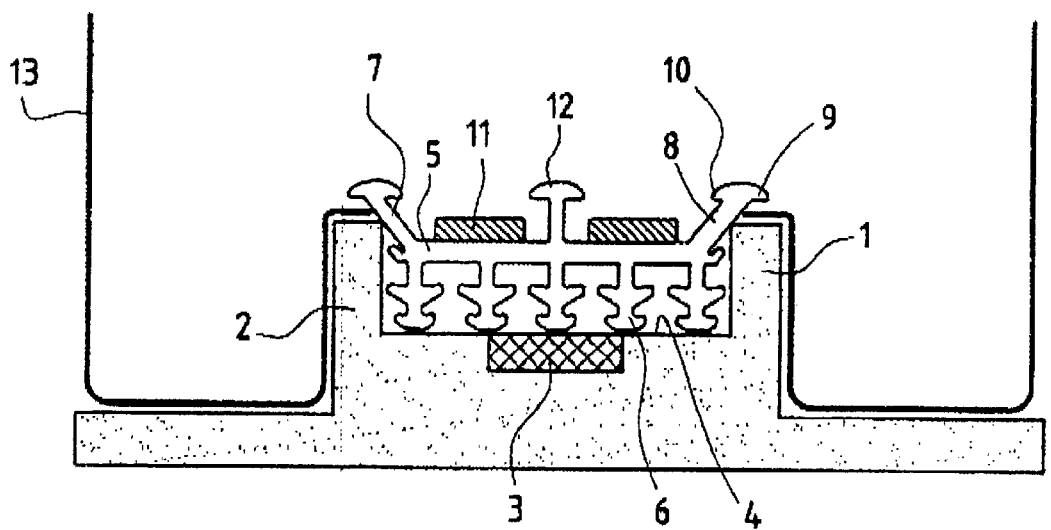

The present invention relates to components for overcasting, moulded objects into which those components are overcast, and manufacturing processes of moulded objects. A choice application of the invention is the manufacture of covers or seats for cars or planes.

To equip a part in a plastic material, such as a polyurethane part constituting a cover, with a component for overcasting so as to equip this cover with means of fixation, a known method is to apply a component for overcasting with a base on both sides of a cavity arranged at the bottom of a cast.

Fixating elements are to be found on the underside of the base. A magnet is to be found at the bottom of the cavity, whereas a metallic layer—which can be attracted by the magnet—is deposited on the upper side of the base.

A layer of foam is applied by glue between the base and both sides of the cavity standing out at the bottom of the mould, in order to ensure that the cavity remains liquid-proof and that the fixating capacity of the fixating elements to be found therein is not altered by the liquid foam used to cast the polyurethane afterwards.

When the liquid foam used to cast the moulded object is poured, its weight crushes the foam which ensures that the cavity remains liquid-proof. The assembly procedure in the mould is fast and the liquid-proofness is appropriate, but the manufacturing is complicated. Notably, in order to apply foam around the underside of the base, the fixating elements of the base features must be crushed at first.

The inconvenience can be remedied with equipping the base with two ramps at each opposite side of the base, jutting upwards and away from one another.

The base is maintained in the cavity, with placing the entire base and its ramps within this cavity. A small flexion of the ramps allows for clasping them to the inside vertical sides of the walls that form the cavity at the bottom of the mould.

The flexion by clasping of the ramps ensures the cavity remains liquid-proof, but the clasping is a time-intensive operation.

The aim of the invention is to remedy these inconveniences with a component for overcasting that does not necessitate crushing the fixating elements at its periphery, nor applying layers of glue and foam, nor clasping ramps to the auxiliary cavity at the bottom of the mould in the assembly procedure.

This simplifies and speeds up the assembly in the mould, without complicating the manufacturing of the component for overcasting itself as before. Furthermore, the invention simplifies the casting of the base and ensures the moulded object is firmly adhered with the base.

The component for overcasting includes a base, flexible elements are to be found on the underside of the base. Two ramps jut upwards and away from two opposite lateral sides of the upperside of the base.

According to the invention, material which can be attracted by a magnet is applied on the upper side of the base.

In order to manufacture the moulded object, the ramps of the component for overcasting are laid on the two walls situated at the bottom of the mould, between which a magnet is fixated at the bottom of the mould. This is in order for the material which can be attached by a magnet to be efficiently attracted by the magnet at the bottom of the mould and the component for overcasting to be well maintained on the ramps. Thus, resulting in an appropriate liquid-proofness.

The mould is then filled with a liquid plastic material, which is then left to solidify, end the moulded object is then cast.

Any clasping is therefore eliminated, whilst appropriate liquid-proofness is ensured by the magnetic attraction, without the need to deposit a supplementary layer of foam and a layer of glue between the walls and the sides of the component for overcasting, nor especially crushing the fixating elements situated at the periphery of the base.

The base is usually a plastic material, for instance of a thermoplastic type, notably in polypropylene, polyamide, etc. Steel powder mixed in with polymer resins can be used as the material that can be attracted by a magnet, notably in a ratio of forty/sixty percent of the weight to seventy/thirty percent of the weight.

In a preferred invention, the free edges of the ramps feature a lip jutting outward.

When the base is placed, these lips are higher than the top of the walls so that, when the moulded object is cast, some of the liquid material not only deposits on the upper side of these lips, but also on part of their underside.

A part of the object is therefore in contact with the underside of the ramps and is well maintained by the base, without it being necessary to implement particular fixating elements and without it preventing an easy casting of the base, since the lips are cast with it, it is however possible to also implement fixating elements on the upper side of the base and lips jutting inward from the free edges of the ramps, to achieve a similar purpose.

The ramps may not be flat. They will preferably feature an angle of ninety degrees to one hundred and seventy degrees between them.

A moulded object is therefore obtained, which includes a main body cast in a plastic material and to which is fixated, by casting, a component for overcasting according to the invention.

The body may be in a plastic material compatible with that of the component for overcasting, ie which manages adherences between the body and the base during the casting in the mould. The possibility exists however, to extend the range of plastic materials to be used for the body and the component for overcasting, as part of the body is in contact with the underside of the ramps and therefore creates a fixation.

Polyurethanes can be used as a material for the body. Most often, the body is in a material different to that of the base, in order to respectively equip each with the best suited properties, for instance the elasticity of the filling foam for a cushion and the rigidity for a fixating component.

A component for overcasting can be manufactured by extrusion, for instance using the same process as described in the European patent No 0 657 118 in the name of Kuraray Co. Ltd., which is incorporated hereby by reference.

The invention is illustrated in the sole FIGURE annexed.

The FIGURE represents the transversal side of the bottom of a mould. Two vertical and parallel walls 1 and 2 jut upward from it. A permanent magnet 3 is fixated on the bottom of the mould between walls 1 and 2. Both walls 1 and 2 form a cavity 4, shaped as a drain.

A component for overcasting includes a base 5, which features fixating elements 6 on its underside and two ramps 7, 8 jutting upwards and away from one another, from two opposite lateral sides of the upper side of the base.

The free edges of the ramps feature a lip 8 jutting outward as well as a lip 10 jutting inward, these lips are horizontal. Pods 11 are deposited on the upper side of the base 5, which are in a material that can be attracted by a magnet, notably steel powder mixed to a polymer resin in a ratio of fifty/fifty of the weight. Anchoring elements 12, shaped as hooks or mushrooms, are to be found on the upper side of the base 5.

In order to cast an object ramps 7, 8 are placed on the edges of walls 1, 2 so that a part of the ramp remains between the edges of while 1, 2 and the lip 9.

The fixating elements 6 are then trapped in the cavity 4, which is made liquid-proof since the cooperation of the magnet 3 and the pods 11 ensures a solid contact between ramps 7, 8 and the top of the inside edges of walls 1, 2.

The mould is then filled with a liquid plastic material, notably polyurethane.

This material fills the entire mould except for cavity 4, within which it cannot penetrate, and it notably fills the space between lip 9 and walls 1, 2.

The material is then left to solidify to form a body 13, which is then cast.

The dimension of the component for overcasting is generally between one hundred and five hundred millimeters lengthwise (perpendicularly to the FIGURE).

The width of the base 5 is between eight and twenty millimeters, preferably between ten and fifteen millimeters, ie twelve millimeters.

Pods 11 take the form of two longitudinal ribbons, approximately 3.5 millimeters wide and 0.5 millimeters thick. Both ribbons or pods adhere to the upper surface of base 5 because of the resin that constitutes part of the steel/resin mix they are made of.

The ribbons that form pods 11 are deposited on the base 6 after the component for overcasting has been formed by extrusion.

We claim:

1. A fastener assembly, comprising:
   (a) a mold form including a mold cavity defined by upright mold walls terminating at upper wall corner edges; and
   (b) a fastener member of being secured to the surface of a foam body during a molding process in the mold form, comprising:
      (i) an elongate base having upper and lower opposed faces;
      (ii) fixating elements positioned on the lower face of the base for being positioned within and protected by the walls of the mold cavity against foam contamination during the molding process;
      (iii) first and second opposed, elongate sealing ramps positioned on the upper face of the base by respective proximal ends and diverging outwardly and upwardly at an angle oblique to the base and defining respective outwardly-extending distal ends;
      (iv) the base sized to fit within the mold cavity of the mold form with outer surfaces of the respective first and second ramps engaging and sealingly contacting respective upper wall corner edges of the mold at points of contact intermediate the proximal and distal ends thereof; and
      (v) a magnetically-attractable material fixed to the base for being magnetically attracted to a magnet positioned in the mold cavity to thereby seal the cavity against the sealing ramps to prevent foam from entering the mold cavity at a contact line between said sealing ramps and said respective upper wall corner edges of the mold.

2. A fastener assembly according to claim 1, wherein the distal end of the respective first and second ramps includes outwardly protruding anchoring lips thereon for being spaced above the walls of the mold cavity and being entrapped in the foam during the molding process.

3. A fastener assembly according to claim 2, wherein the anchoring lips are positioned to extend both inwardly towards the base and outwardly away from the base when the fastener member is positioned in the mold cavity during a molding process.

4. A fastener assembly according to claim 3, wherein the anchoring lips extend both outwardly away from the base and into a position above and outside the plane of the walls of the mold cavity when the fastener member is positioned in the mold cavity during a molding process.

5. A fastener assembly according to claim 1, wherein the base is made of plastic material.

6. A fastener assembly according to claim 1, wherein the base is made of thermoplastic material.

7. A fastener assembly according to claim 1, and including an upwardly projecting anchor positioned on the upper face of the base for being embedded in the foam and thereby anchoring the fastener element to the foam body.

8. A fastener assembly according to claim 1, wherein the magnetically-attractable material is positioned on the upper face of the base.

* * * * *